US007556059B2

(12) United States Patent
Takeda et al.

(10) Patent No.: US 7,556,059 B2
(45) Date of Patent: Jul. 7, 2009

(54) TANK STRUCTURE

(75) Inventors: Hideyuki Takeda, Komaki (JP); Kana Shibata, Komaki (JP); Minoru Funahashi, Komaki (JP)

(73) Assignee: CKD Corporation, Komaki (JP)

( * ) Notice: Subject to any disclaimer, the term of this patent is extended or adjusted under 35 U.S.C. 154(b) by 293 days.

(21) Appl. No.: 11/390,110

(22) Filed: Mar. 28, 2006

(65) Prior Publication Data

US 2006/0243751 A1 Nov. 2, 2006

(30) Foreign Application Priority Data

Apr. 27, 2005 (JP) .............................. 2005-130056
Aug. 5, 2005 (JP) .............................. 2005-228749

(51) Int. Cl.
*F16K 24/00* (2006.01)

(52) U.S. Cl. ...................................................... 137/588

(58) Field of Classification Search ................. 137/587, 137/259, 376, 558, 588, 589; 220/366.1, 220/23.87, 592

See application file for complete search history.

(56) References Cited

U.S. PATENT DOCUMENTS 931,647 A * 8/1909 Rademacher ............... 137/340
1,533,173 A * 4/1925 Egloff et al. ................ 220/327
1,587,943 A * 6/1926 Fisher ........................ 137/390
2,360,391 A * 10/1944 Birchall ...................... 220/592
3,467,273 A * 9/1969 Campbell et al. ........... 220/378
3,906,567 A * 9/1975 Barth et al. ..................... 470/4
3,924,773 A * 12/1975 Wilkinson ................. 220/88.3
4,086,166 A * 4/1978 Martin .................... 210/257.2
4,360,003 A * 11/1982 Hardy ..................... 126/367.1
4,478,345 A * 10/1984 Edinger ...................... 220/724
4,484,689 A * 11/1984 Fuchs, Jr. .................... 220/592
4,513,550 A * 4/1985 Kotcharian .............. 52/745.01
4,960,151 A * 10/1990 Kaminski et al. ........... 137/376
5,088,621 A * 2/1992 Thompson et al. ............. 222/1
5,372,772 A * 12/1994 Bambacigno et al. ....... 264/278
5,601,745 A 2/1997 Schalk et al.
6,318,581 B1 * 11/2001 Garton ....................... 220/565
6,536,683 B1 * 3/2003 Filicicchia et al. .......... 239/124
6,827,289 B2 * 12/2004 Filicicchia et al. .......... 239/124

FOREIGN PATENT DOCUMENTS

JP A-3-256870 11/1991
JP A 9-286490 11/1997
JP A 11-91866 4/1999
JP A 11-310258 11/1999

* cited by examiner

*Primary Examiner*—Stephen M Hepperle
*Assistant Examiner*—Craig M Schneider
(74) *Attorney, Agent, or Firm*—Oliff & Berridge, PLC

(57) ABSTRACT

A tank structure comprises a tank body for storing liquid and control devices for supplying or discharging the liquid to or from the tank body. The tank structure further includes an upper exterior member having a lower flat surface and a lower exterior member having an upper flat surface. The tank body includes an upper and a lower flat surfaces facing the lower flat surface of the upper exterior member and the upper flat surface of the lower exterior member. The tank body is held in sandwiched between the upper and lower exterior members.

10 Claims, 16 Drawing Sheets

TANK STRUCTURE

BACKGROUND OF THE INVENTION

1. Field of the Invention

The present invention relates to a tank structure provided with a member or part for reducing a deformation amount of a tank body.

2. Description of Related Art

As shown in FIG. 16 as a sectional view, Jpn. unexamined patent publication No. 11-310258(1999) discloses a tank structure 401 including an opening of a pressure-feeding plastic housing 411. In this tank structure 401, a cover 412 is secured to a fastening ring 413 with a screw 415. A flange 414 provided around the opening of the housing 411 is held between the cover 412 and the ring 413, providing a sealing configuration for the opening of the housing 411.

As shown in FIG. 17 as a sectional view, Jpn. unexamined patent publication No. 11-91866(1999) discloses a chemical liquid vessel 201 including an opening of a resinous housing 211. In this chemical liquid vessel 201, a pressure ring 212 is secured to a bolt-receiving ring 213 with a bolt and a nut 214. A pressure cap 216 is held between the pressure ring 212 and the bolt-receiving ring 213. Accordingly, the resinous housing 211 is sealed with an inner cover 215.

Jpn. unexamined patent publication No. 9-286490(1997) discloses a tank structure 301 as shown in FIG. 18 as a sectional view. In this tank structure 301, a tank head 312 and a tank barrel 313 are internally applied with a corrosion protection resin lining 311 and are connected to each other with a conductive bolt 314. Further, a tube 316 is welded to the resin lining 311 with a welded portion 315.

In the tank structure 401 of FIG. 16, however, in case that the pressure-feeding plastic housing 411 is deformed by its internal pressure, a gap may be generated between the opening portion of the housing 411 and the cover 412, resulting in a deterioration of sealing strength therebetween.

In the chemical liquid vessel 201 of FIG. 17, further, if the resinous housing 211 is deformed by its internal pressure, a gap may be generated between the opening portion of the resinous housing 211 and the inner cover 215, thus resulting in a deterioration of sealing strength therebetween.

In the tank structure 301 of FIG. 18, the tank head 312 and the tank barrel 313 are connected by the conductive bolt 314. However, this bolt 314 merely serves to connect the tank head 312 and the tank barrel 313 in part of the resin lining 313, applying the fastening force to only the part of the resin lining 313. Accordingly, even in case that the pressure in the resin lining 311 changes to deform the resin lining 311, the tank head 312 and the tank barrel 313 will not follow the deformed lining 311. Thus, the deformation amount of the resin lining 311 could not be reduced. When the internal pressure of the resin lining 311 changes, deforming the resin lining 311, the welded portion 315 between the resin lining 311 and the tube 316 may peel or come off, resulting in a decrease of sealing strength.

In the conventional tank structure, a tank body may expand and be deformed by its internal pressure. For this reason, the welded portion between an exterior member and the tank body may peel or come off and the sealing strength may deteriorate. In particular, when the tank body is made of resin which is largely deformable, the welded portion between the exterior member and the tank body will peel or come off. The sealing strength may largely decrease.

Each of conventional fluid couplings is mounted in a cover covering a tank opening to connect each external pipe line to a tank. Hence, many fluid couplings corresponding to the external pipe lines have to be assembled to the tank. This may cause leakage of liquid or gas with a higher risk. In case that the assembling utilizes welding, further, an assembling cost may increase.

Moreover, the fluid couplings must be made of a specific resin, for example tetrafluoroethylene (PTFE, PFA) resin depending on chemical liquid to be treated. However, the tetrafluoroethylene resin is difficult to mold in complicated shape needed for attachment to the cover of the tank. The tetrafluoroethylene resin is relatively expensive and a completed tank will also be expensive.

SUMMARY OF THE INVENTION

The present invention has been made in view of the above circumstances and has an object to provide a tank structure with a reduced deformation amount of a tank body and stable sealing strength.

Another object of the present invention is providing a tank structure easy to assemble, and occupying only a minimum installation area.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a tank structure that has a tank body for storing liquid and a control device for supplying or discharging the liquid to or from the tank body, the tank structure comprising: an upper member having a lower flat surface; and a lower member having an upper flat surface; wherein the tank body has an upper flat surface and a lower flat surface which face the lower flat surface of the upper member and the upper flat surface of the lower member respectively, and the tank body is held in sandwiched relation between the upper and lower members so that the upper and lower flat surfaces of the tank body are in contact with the lower flat surface of the upper member and the upper flat surface of the lower member respectively.

According to the above invention, the first and second exterior members serve to restrain the deformation amount of the tank body, so that the sealing strength of the tank body can be stable.

According to another aspect, the present invention provides a tank structure comprising a tank body for storing liquid, a liquid supply coupling for allowing the liquid to flow in the tank body; a liquid discharge coupling for allowing the liquid to flow out of the tank body; a gas supply coupling for supplying gas to the tank body to allow the liquid to flow out of the tank body; a gas exhaust coupling for exhausting the gas from the tank body; wherein the tank structure further comprises a valve and coupling integrated unit including: a liquid supply valve for controlling a flow rate of the liquid, a gas supply valve for controlling a flow rate of the gas to be supplied; a gas exhaust valve for controlling a flow rate of the gas to be exhausted; a liquid supply passage for providing communication between the liquid supply coupling and the tank body through the liquid supply valve; and a gas passage for providing communication between the gas supply coupling and the tank body via the gas supply valve while providing communication between the gas exhaust coupling and the tank body via the gas exhaust valve.

With the above structure, when the fluid couplings previously provided with valve seats are simply fixed to the tank opening portion, the tank structure having the valve and coupling integral unit and the tank can be achieved. The fluid couplings can be integrated by a small number of parts or components to achieve space-saving.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of preferred embodiments of the present invention will now be given referring to the accompanying drawings.

[Configuration of a Tank Structure in a First Embodiment]

Firstly, an external configuration of a tank structure 1 in the first embodiment will be described below.

Figure 1:
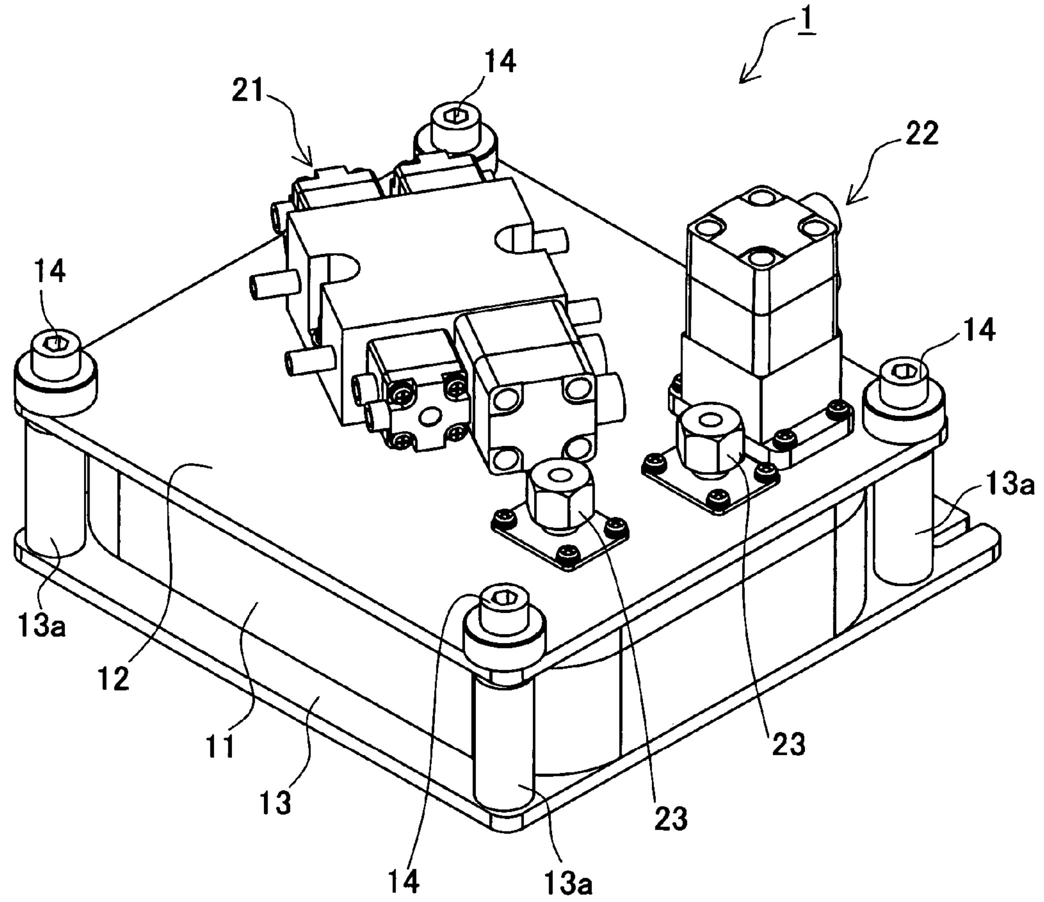
FIG. 1 is an external perspective view of a tank structure in a first embodiment of the present invention.
Figure 2:
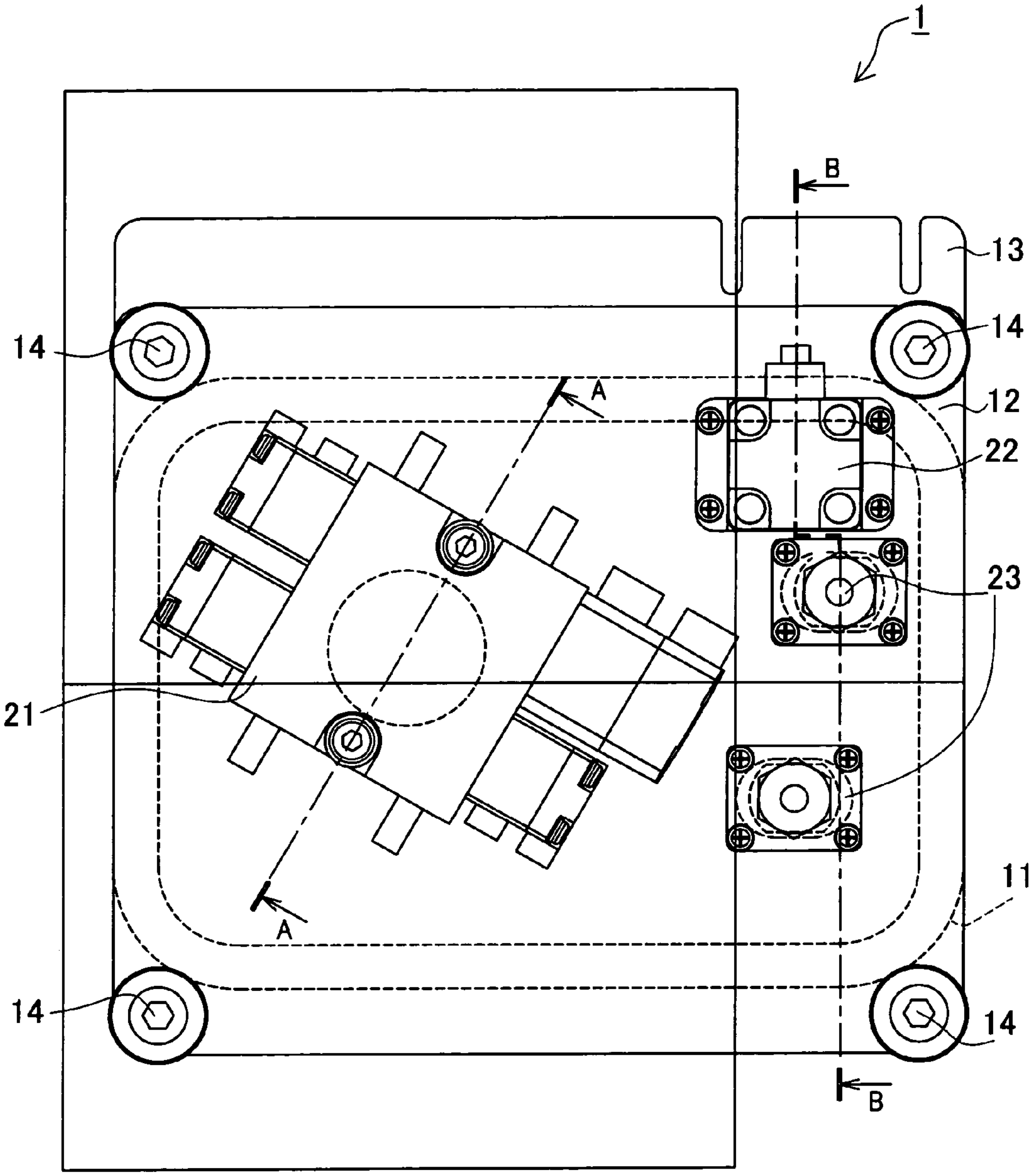
FIG. 2 is a top view of the tank structure.
Figure 3:
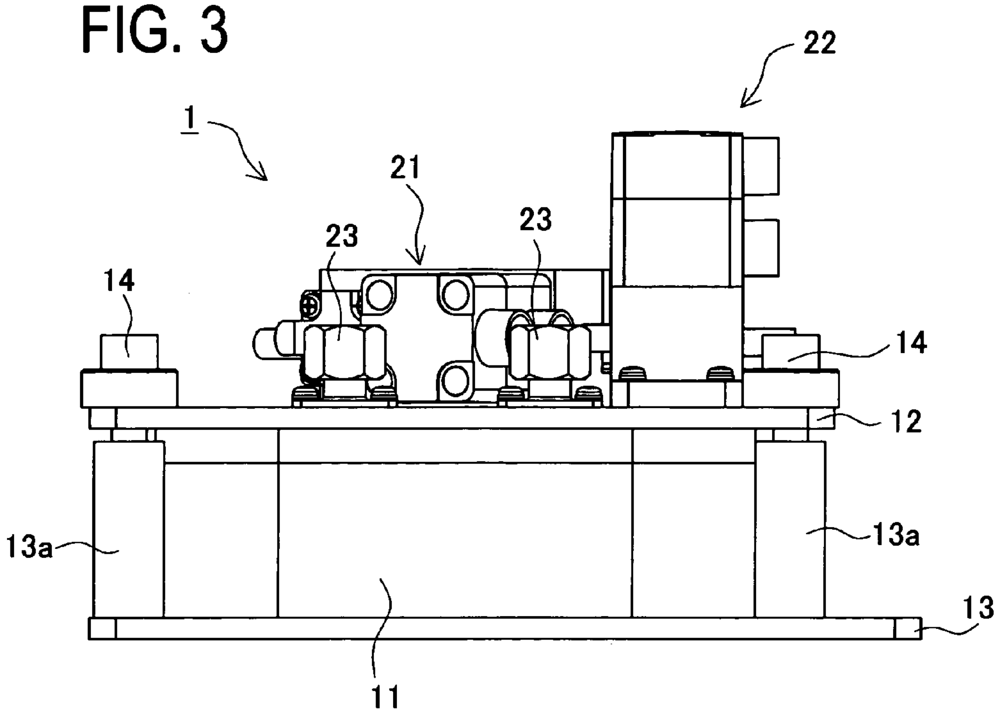
FIG. 3 is a side view of the tank structure.

FIG. 1 an external perspective view of the tank structure 1. FIG. 2 is a top view of the same. FIG. 3 is a side view of the same. As shown in FIGS. 1 through 3, the tank structure 1 basically comprises a tank body 11, an upper exterior member 12, a lower exterior member 13, and others.

Figure 5:
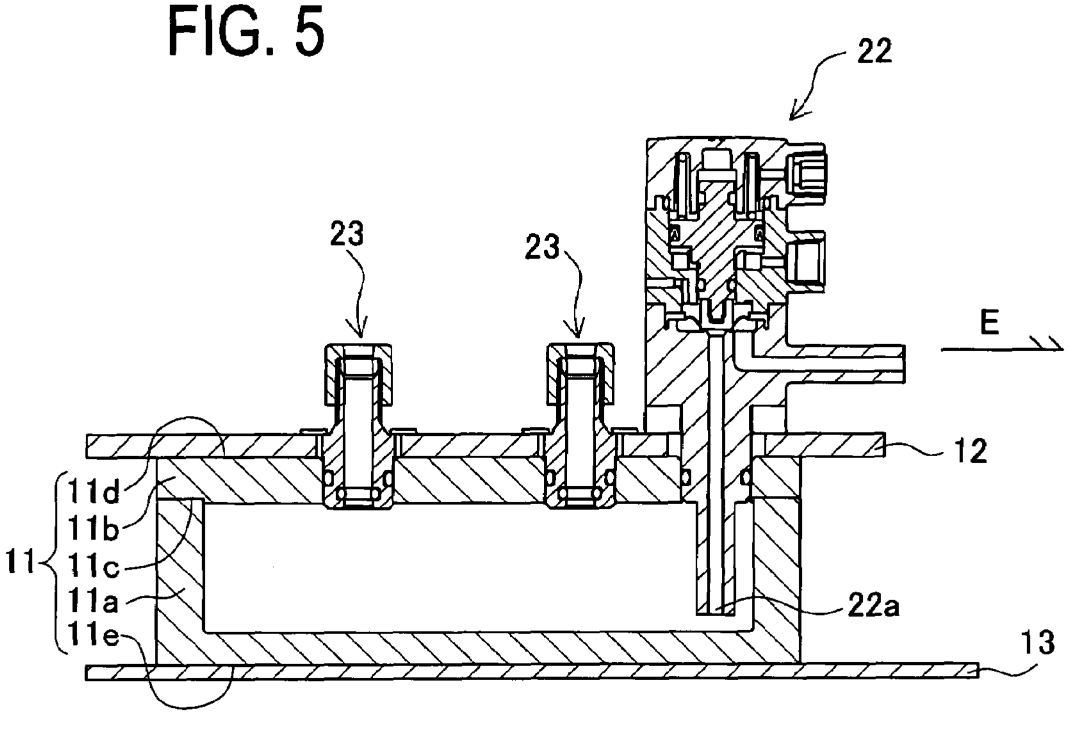
FIG. 5 is a sectional view of the tank structure taken along a line B-B of FIG. 2.

The tank body 11 is explained below. FIG. 5 is a sectional view of the tank structure 1 taken along a line B-B of FIG. 2. The tank body 11 is made of resin and includes a resinous box-shaped housing 11*a* covered with a resinous cover 11*b* welded to the housing 11*a* as shown in FIG. 5. Thus, the tank body 11 is of a substantially rectangular parallelepiped shape whose width is larger than the height. The tank body 11 also has an upper flat surface 11*d* as the top surface of the cover 11*b* and a lower flat surface 11*e* as the bottom surface of the housing 11*a*.

Figure 7:
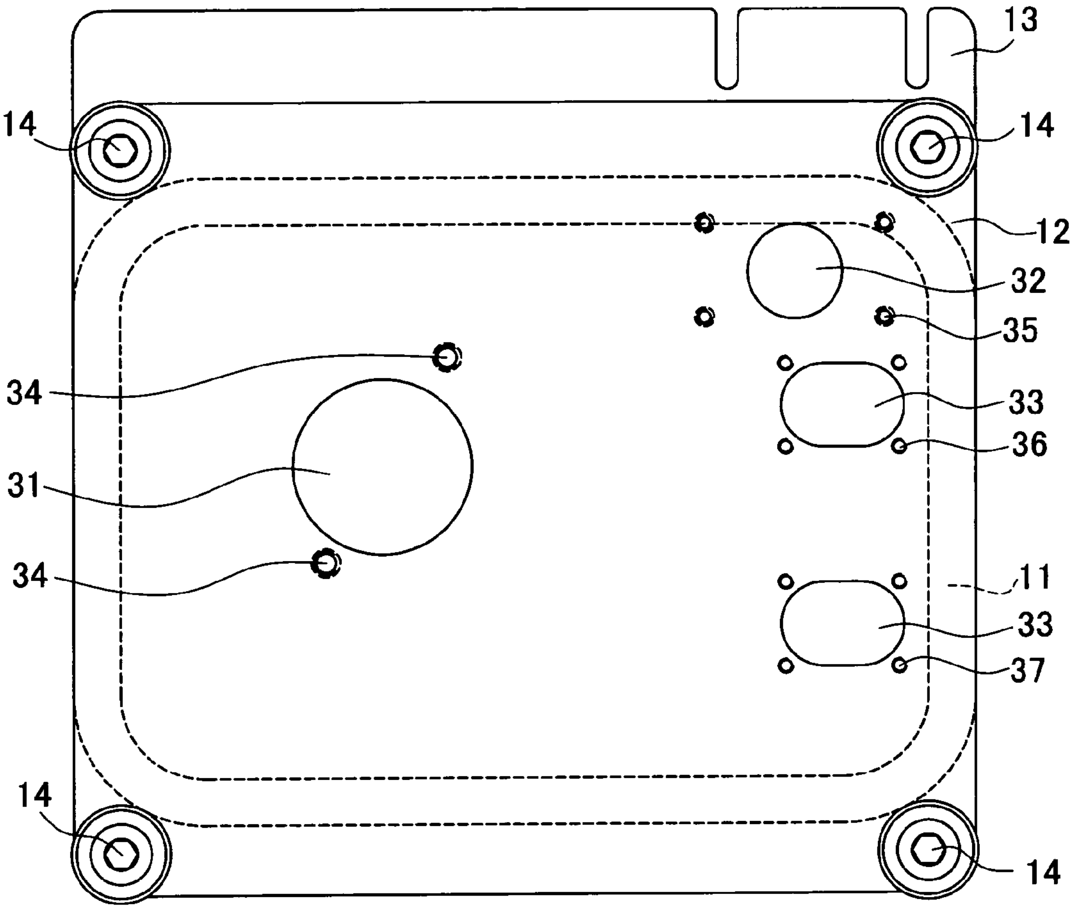
FIG. 7 is a top view of the tank structure in a previous state to mounting of each control device thereon.

The upper exterior member 12 is explained below. As shown in FIGS. 1 through 3, the upper exterior member 12 is formed in a rectangular flat plate and made of a material having higher strength than the material of tank body 11, such as resin (e.g., polyvinyl chloride (PCV)), metal (e.g., SUS304), and ceramic. The upper exterior member 12 has four holes 12*a* (see FIG. 8) at four corners through which bolts 14 extend. FIG. 7 is a top view of the tank structure 1 in a previous state to mounting of various control devices. As shown in FIG. 7, the upper exterior member 12 is formed with insertion holes (31, 32, 33) in which input/output ports of the control devices are fitted and mounting holes (34, 35, 36, 37) for fixing the control devices to the upper exterior member 12, all of the holes being open to the top surface of the exterior member 12. Further, as shown in FIG. 1, on the top surface of the exterior member 12 of the tank structure 1, the control devices such as a manifold valve 21, a drain valve 22, and sensor ports 23 are mounted.

The lower exterior member 13 is explained below. As shown in FIGS. 1 through 3, as with the upper exterior member 12, the lower exterior member 13 is also formed in a rectangular flat plate and made of a material having a higher strength than the material of tank body 11 such as resin, metal, and ceramic. The lower exterior member 13 is provided, at four corners, with four columnar bolt-receiving parts 13*a* each having a tapped hole (see FIG. 8).

The above mentioned tank body 11, upper exterior member 12, and lower exterior member 13 are assembled in such a manner that the tank body 11 is sandwiched between the lower surface of the upper exterior member 12 and the upper surface of the lower exterior member 13; the bolts 14 are inserted through the holes 12*a* of the upper exterior member 12 into the bolt-receiving parts 13*a* of the lower exterior member 13 and screwed therein, thereby securing the upper and lower exterior members 12 and 13 with the bolts 14.

Figure 8:
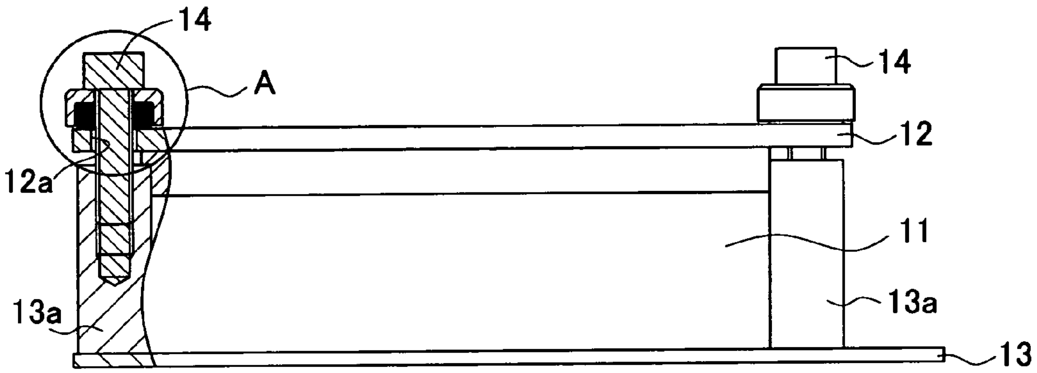
FIG. 8 is a view showing a fastened state with a fastening member.
Figure 9:
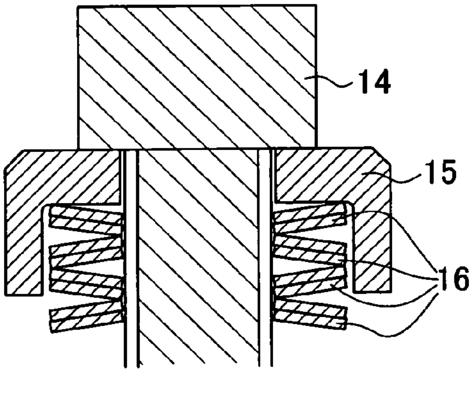
FIG. 9 is a view showing a positional relation between a bolt, a disc-spring retainer, and a disc spring in a fastening part.

FIG. 8 is a side view of the tank structure 1, partially including a sectional view of only the bolt 14. FIG. 9 is an enlarged view of the head portion of the bolt 14 (the portion surrounded by a circle A in FIG. 8). As shown in FIGS. 8 and 9, under the head of the bolt 14, a disc-spring retainer 15 of a substantial cylindrical cup shape centrally having a hole through which the bolt 14 extends is arranged in upside-down state. Inside the retainer 15, a plurality of annular disc springs 16 as a resilient member is arranged. The retainer 15 is placed to cover all of the disc springs 16.

Figure 4:
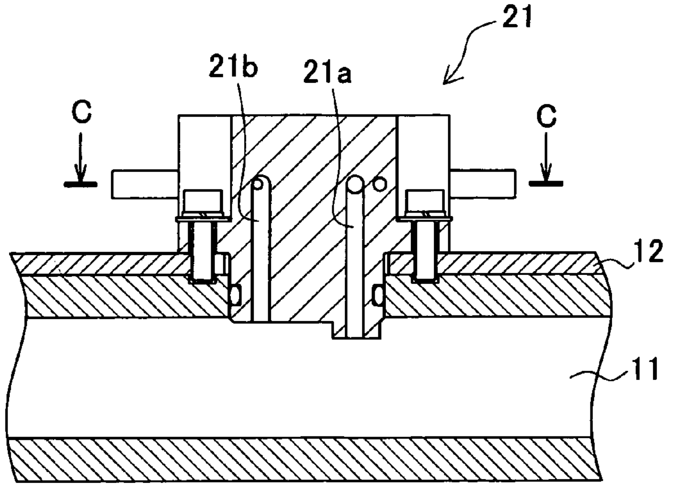
FIG. 4 is a sectional view of the tank structure taken along a line A-A of FIG. 2.

Next, components of the tank structure 1 for fluid control will be described. FIG. 4 is a sectional view of part of the tank structure 1 taken along a A-A line of FIG. 2. As shown in FIG. 4, ports 21*a* and 21*b* of the manifold valve 21 are in open communication with the inside of communicated to the inside of the tank body 11.

As shown in FIG. 5, a port 22*a* of the drain valve 22 and the sensor ports 23 placed on the upper surface of the upper exterior member 12 are in open communication with the inside of the tank body 11. The port 22*a* of the drain valve 22 is formed extending close to the bottom of the tank body 11.

Figure 6:
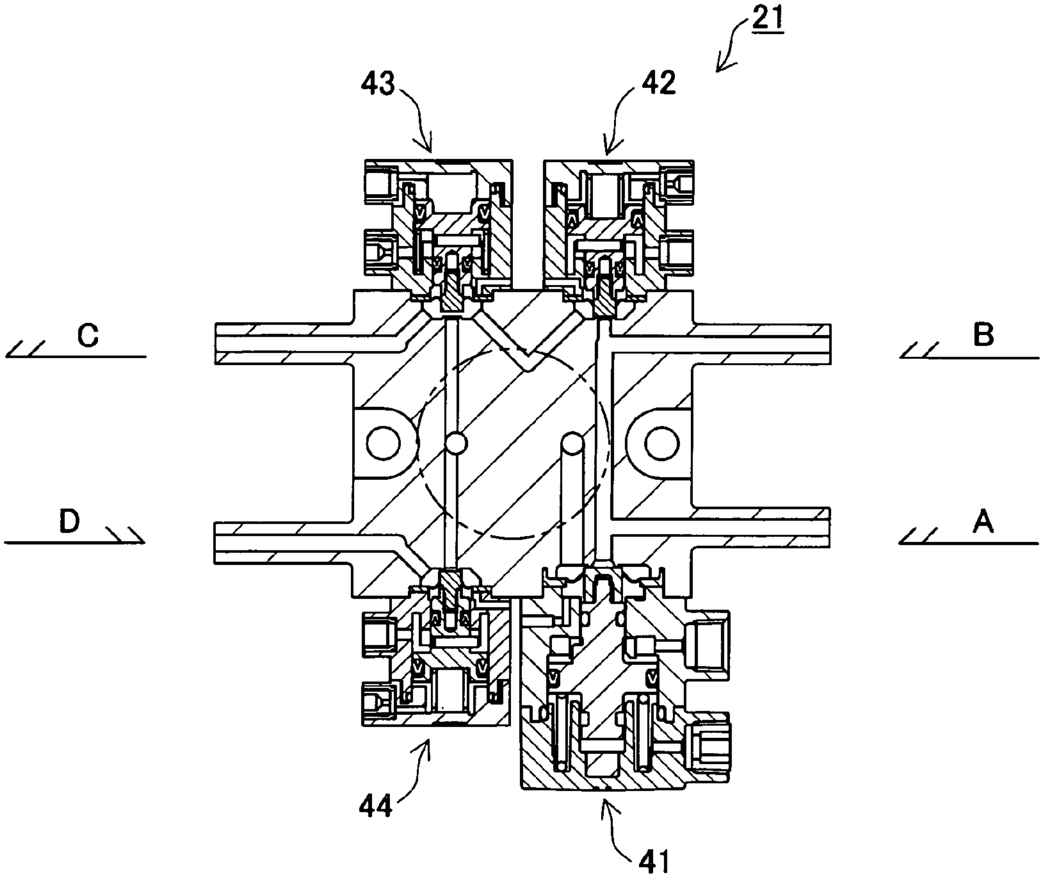
FIG. 6 is a sectional view of the tank structure taken along a line C-C of FIG. 4.

FIG. 6 is a sectional view of the tank body 11 taken along a line C-C of FIG. 4. As shown in FIG. 6, the manifold valve 21 has a plurality of ports (A, B, C, and D) and a plurality of valves (41, 42, 43, and 44).

[Operations of the Tank Structure for the Fluid Control]

The tank structure 1 having the above configuration operates in the following manner for fluid control. Fluid is supplied to the tank structure 1 through the ports A and B of the manifold valve 21 shown in FIG. 6. By operation of the valve 41, the fluid is allowed to flow in the tank body 11 through the port 21*a* shown in FIG. 4. Further, nitrogen gas is supplied through the port D to regulate the pressure in the tank body 11. To the sensor ports 23, a high-position liquid level sensor (not shown) and a low-position liquid level sensor (not shown) are attached respectively. The internal pressure of the tank body 11 is increased by the nitrogen gas supplied therein through the valve 44 via the port D, thereby allowing the fluid to be discharged through the port 21*b* and the port C by operation of the valve 43. Wastewater is drained through the port 22*a* and the port E by operation of the drain valve 22.

The tank structure 1 in the present embodiment has the following features. As mentioned above, the internal pressure of the tank 11 is increased by the nitrogen gas supplied thereto through the port D. At this time, the tank body 11, made of resin, tends to expand and become deformed unless it has an external member. In the tank structure 1 in the present embodiment, however, the upper exterior member 12 is placed on the upper surface of the tank body 11 and the lower exterior member 13 is placed on the lower surface of the tank body 11 and the upper and lower exterior members 12 and 13 are secured by the bolts 14 as fastening members.

In addition, each of the exterior members 12 and 13 has a rectangular flat plate shape as mentioned above. The fastening members 14 are arranged at four corners of each of the exterior members 12 and 13. With this configuration, the fastening force of the fastening members 14 are uniformly applied over the entire exterior members 12 and 13. Hence, the fastening force of the fastening members 14 uniformly acts on the entire upper and lower surfaces of the tank body 11.

Since the fastening force of the fastening members 14 uniformly acts on the entire upper and lower surfaces of the tank body 11, it can absorb the expansion and deformation amount of the tank body 11. Thus, no load will be exerted on the welded portion 11*c* of the tank body 11, causing no possibility that the welded portion peels or comes off. This makes it possible to stably maintain the sealing strength of the body 11.

As shown in FIG. 9, furthermore, the plurality of annular disc springs 16 serving as the resilient member is arranged inside of the disc-spring retainer 15. By the resilient force of this disc springs, therefore, the tank body 11 can surely be prevented from expanding to become deformed. The number of arranged disc springs 16 may be adjusted to control the resilient force of the disc springs 16. Accordingly, the expansion and deformation amount of the tank body 11 can be restrained with more reliability by the resilient force of the disc springs 16 according to the intensity of internal pressure of the tank body 11.

Figure 19:
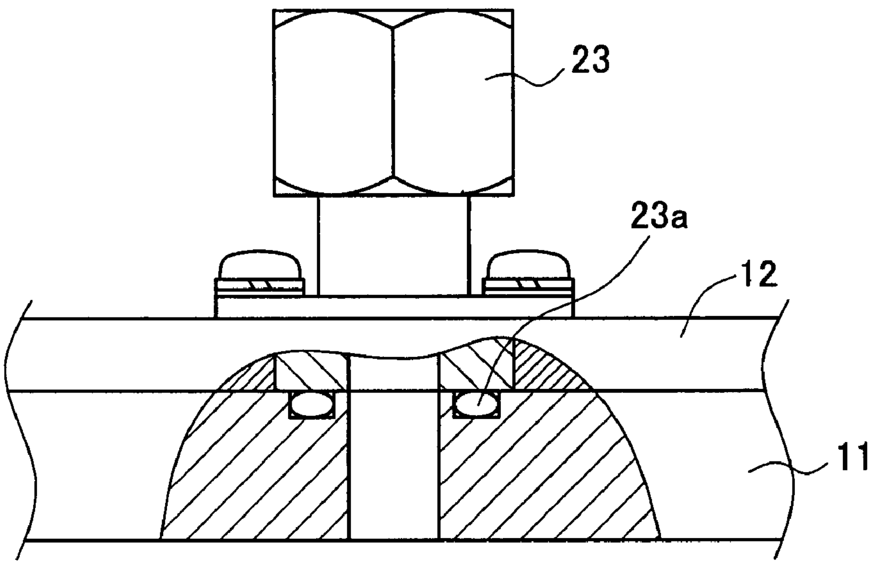
FIG. 19 is a partly sectional view of a part of a tank body and an upper exterior member in the first embodiment.

To maintain the sealing strength between the tank body 11 and each control device, furthermore, a sealing member 23*a* may be placed between the tank body 11 and the upper exterior member 12 to axially seal them as shown in FIG. 19. In this case, the upper exterior member 12 is pressed toward the tank body 11 by the resilient force of the disc springs 16, so that the sealed state can be maintained constantly by the sealing member 23*a*.

The tank structure 1 can readily be assembled by simply mounting various control devices such as the manifold valve 21, the drain valve 22, and the sensor ports 23 on the upper surface of the upper exterior member 12.

When viewed from above the upper exterior member 12, the control devices such as the manifold valve 21, the drain valve 22, and the sensor ports 23 are positioned within the area of the upper exterior member 12. Accordingly, the installation area (space) of the tank structure 1 may be just the area (dimension) of the lower exterior member 13 slightly larger than the upper exterior member 12. Consequently, the tank structure 1 occupies only a minimum installation area.

The upper and lower exterior members 12 and 13 must have flat surfaces but may be formed in various shapes instead of the flat-plate shape. For example, a shape having turned side ends, viewed as angular U-shape in section, may be adopted.

Instead of placing the lower exterior member 13 under the tank body 11, further, the upper exterior member 12 may be secured directly to a base on which the tank body 11 is installed, by the bolts 14. In this case, the tank body 11 sandwiched between the upper exterior member 12 and the base can also reliably be prevented from expanding to become deformed.

The tank structure 1 in the present embodiment as mentioned above can have the following effects and advantages.

(1) In the above embodiment, the tank structure 1 having the tank body 11 storing fluid and the control devices for supplying or discharging the fluid to or from the tank body 11 further comprises the upper exterior member 12 having the lower flat surface and the lower exterior member 13 having the upper flat surface. The tank body 11 has the upper and lower flat surfaces facing the lower flat surface of the upper exterior member 12 and the upper flat surface of the lower exterior member 13 respectively. The tank body 11 is placed in sandwiched relation between the upper and lower exterior members 12 and 13. Accordingly, those exterior members 12 and 13 can reduce the deformation amount of the tank body 11 sufficiently to maintain the sealing strength of the tank body 11.

(2) In the tank structure having the above configuration, the tank body 11 may be held between the lower surface of the upper exterior member 12 and the upper surface of the base as mentioned above. Accordingly, the upper exterior member 12 and the base serve to reduce the deformation amount of the tank body 11 sufficiently to maintain the sealing strength of the tank body 11.

(3) Furthermore, the upper and lower exterior members 12 and 13 are made of materials having higher strength than the tank body 11. It is therefore possible to more reliably maintain the sealing strength of the tank body 11, the deformation amount of which is reduced by the exterior members 12 and 13 or by the upper exterior member 12 and the base.

(4) The tank structure 1 includes the bolts 14 fastening the upper exterior member 12 to the lower exterior member 13 or the base on which the tank body 11 is installed. In addition, arranged between the head of each bolt 14 and the upper exterior member 12 are the disc springs 16. By the resilient force of the disc springs 16, the dimension changes of the tank body 11 can be restrained even when the tank body 11 thermally expands or can be absorbed even if the tank body 11 contracts or shrinks by low-temperature fluid.

(5) In the present embodiment, the control devices are mounted on the upper surface of the upper exterior member 12 as mentioned above. Accordingly, no additional parts or members for mounting the control devices to the tank body 11 are required. Those control devices may be mounted in one way direction. Consequently, the tank structure 1 can readily be assembled.

(6) The control devices are arranged within the area of the upper surface of the upper exterior member 12, so that the tank structure 1 occupies only a minimum area.

Next, a second embodiment of the present invention will be described below with reference to FIGS. 10 through 14.

[Configuration of a Tank Structure in the Second Embodiment]

Figure 11:
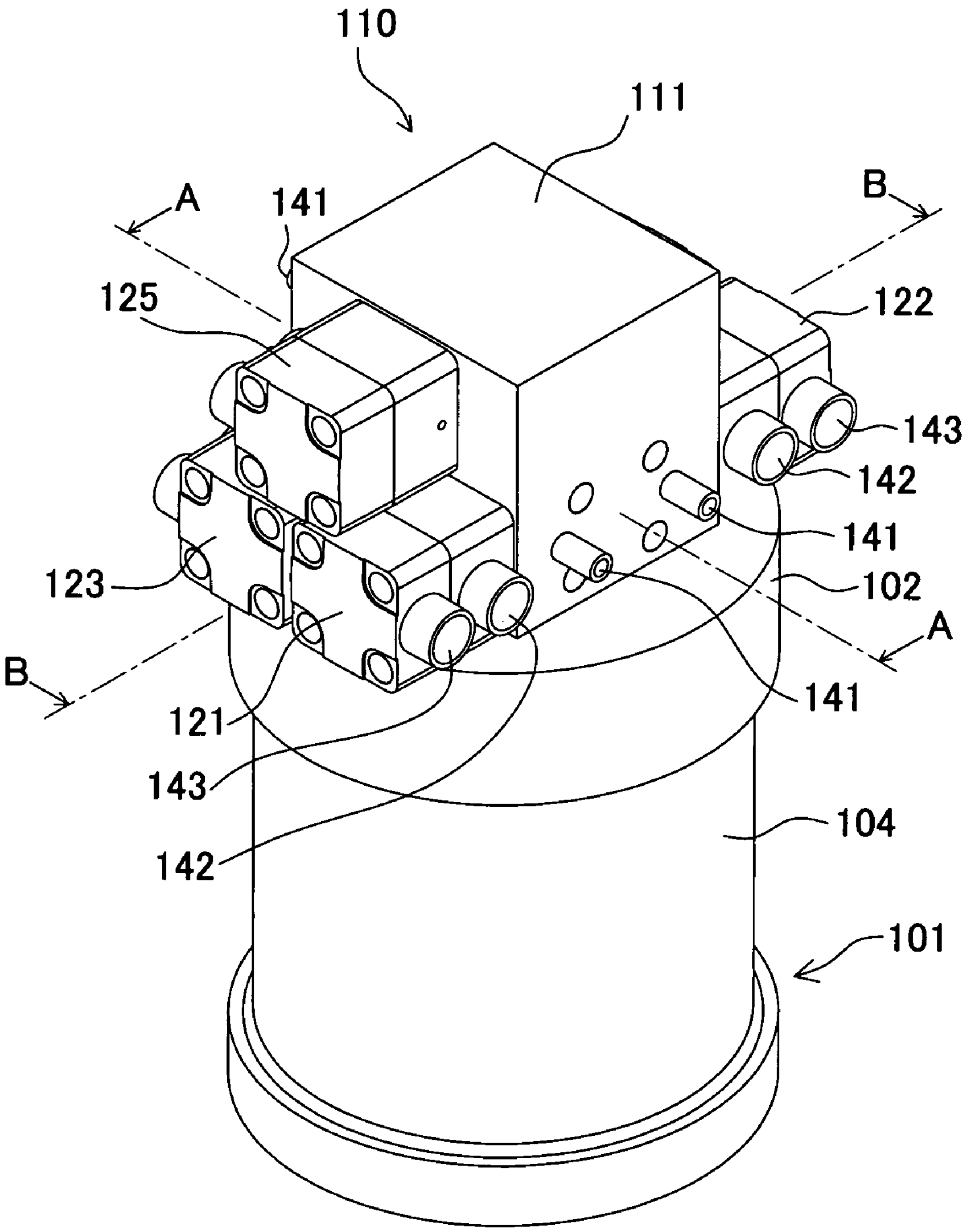
FIG. 11 is an external view of the tank structure in the second embodiment.

FIG. 11 is an external view of the tank structure in the second embodiment. This tank structure basically includes a tank (tank body) 101 and a valve and coupling (hereinafter, valve-coupling) integrated unit 110 and others. The tank 101 includes a sealing cover 102 and a tank housing 104 and others. The sealing cover 102 is mounted on the tank housing 104 to tightly close an open end of the tank housing 104. This sealing cover 102 is formed with an opening having a small-diameter portion 102*a*, an internally-threaded portion 102*b* and a large-diameter portion 102*c*. The valve-coupling integrated unit 110 includes a fluid coupling block (hereinafter, coupling block) 111 in which a plurality of flow passages (130, 131, 132, 133, 134, 135, 16) and valve seats 148 are formed, and a plurality of valves for controlling the flow rate of liquid, including two liquid supply valves 121 and 122, gas supply valve 123, gas exhaust valve 124 and liquid discharge valve 125.

Figure 10:
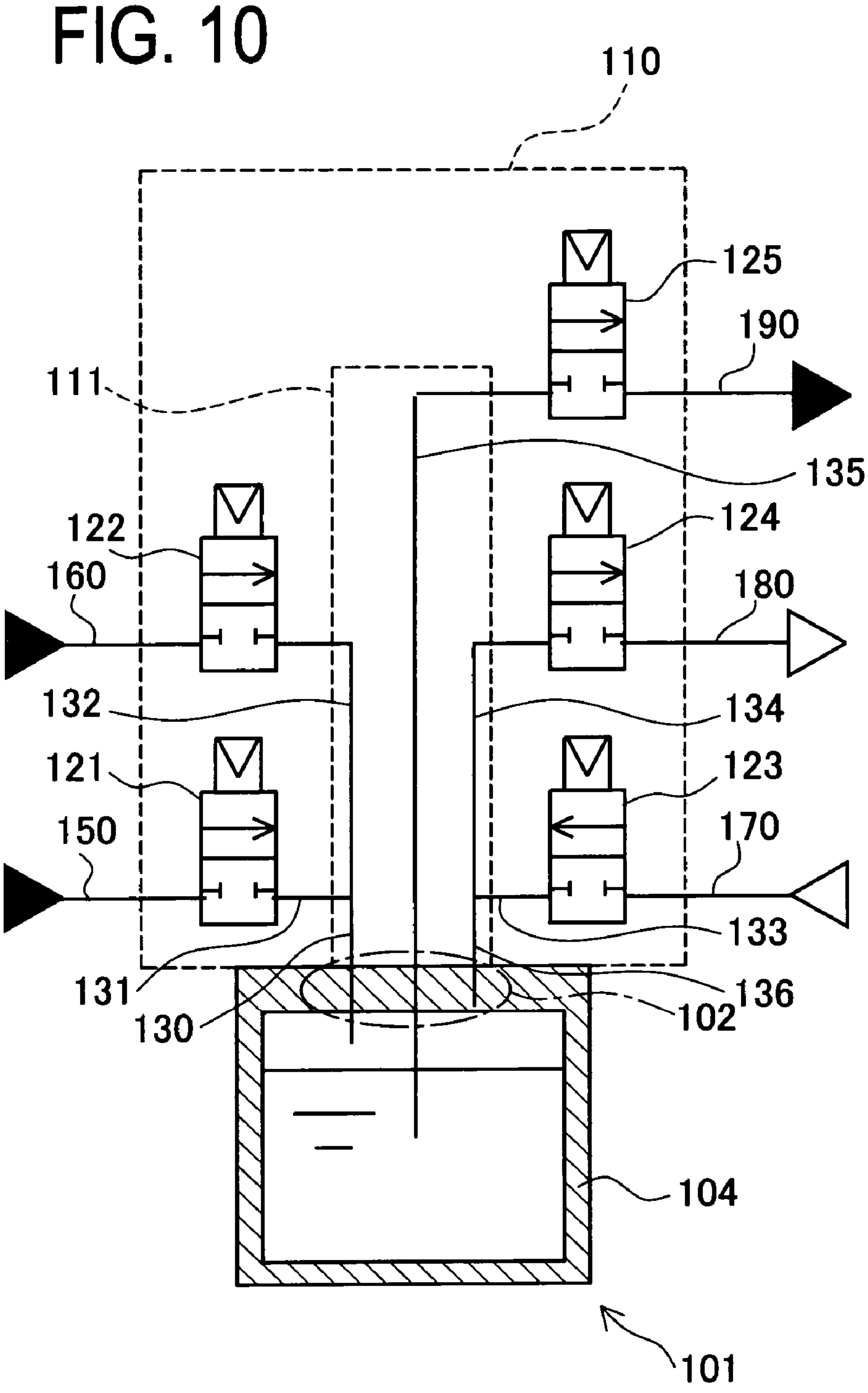
FIG. 10 is a circuit diagram of a tank structure in a second embodiment of the present invention.

FIG. 10 is a circuit diagram of the tank structure in the present embodiment. The sealing cover 102 indicated by a chain double-dashed line is mounted on the tank housing 104 on its opening side. To such sealing cover 102 the valve-coupling integrated unit 110 indicated by a broken line is mounted. This integrated unit 110 includes the coupling block 111 indicated by a broken line. The coupling block 111 is internally formed with a liquid supply passage 130 connected to liquid supply passages 131 and 132 through which chemical liquid is supplied into the tank 101, and a gas supply/exhaust passage 136 connected to a gas supply passage 133 through which air and N2 gas is supplied into the tank 101 for feeding a chemical liquid under pressure from the tank 101 and also connected to a gas exhaust passage 134 through which the air and N2 gas are exhausted from the tank 101. Further, the coupling block 111 is further provided with a liquid discharge passage 135 through which the chemical liquid is discharged from the tank 101. The above passages of the coupling block 111 are connected to the corresponding valves; specifically, the liquid supply passage 131 is connected to the valve 121, the liquid supply passage 132 is connected to the valve 122, the gas supply passage 133 is connected to the valve 123, and the gas exhaust passage 134 is connected to the gas exhaust valve 124. The liquid discharge passage 135 is connected to the liquid discharge valve 125. Further, the liquid supply valve 121 is connected to a liquid supply line 150, the liquid supply valve 122 is connected to a liquid supply line 160, the gas supply valve 123 is connected to a gas supply line 170, and the gas exhaust valve 124 is connected to a gas exhaust line 180. The valve 125 is connected to a liquid discharge line 190. Please note that the gas supply line 170 is provided with a pressure reducing valve (not shown) and a pressure gauge (not shown).

Figure 12:
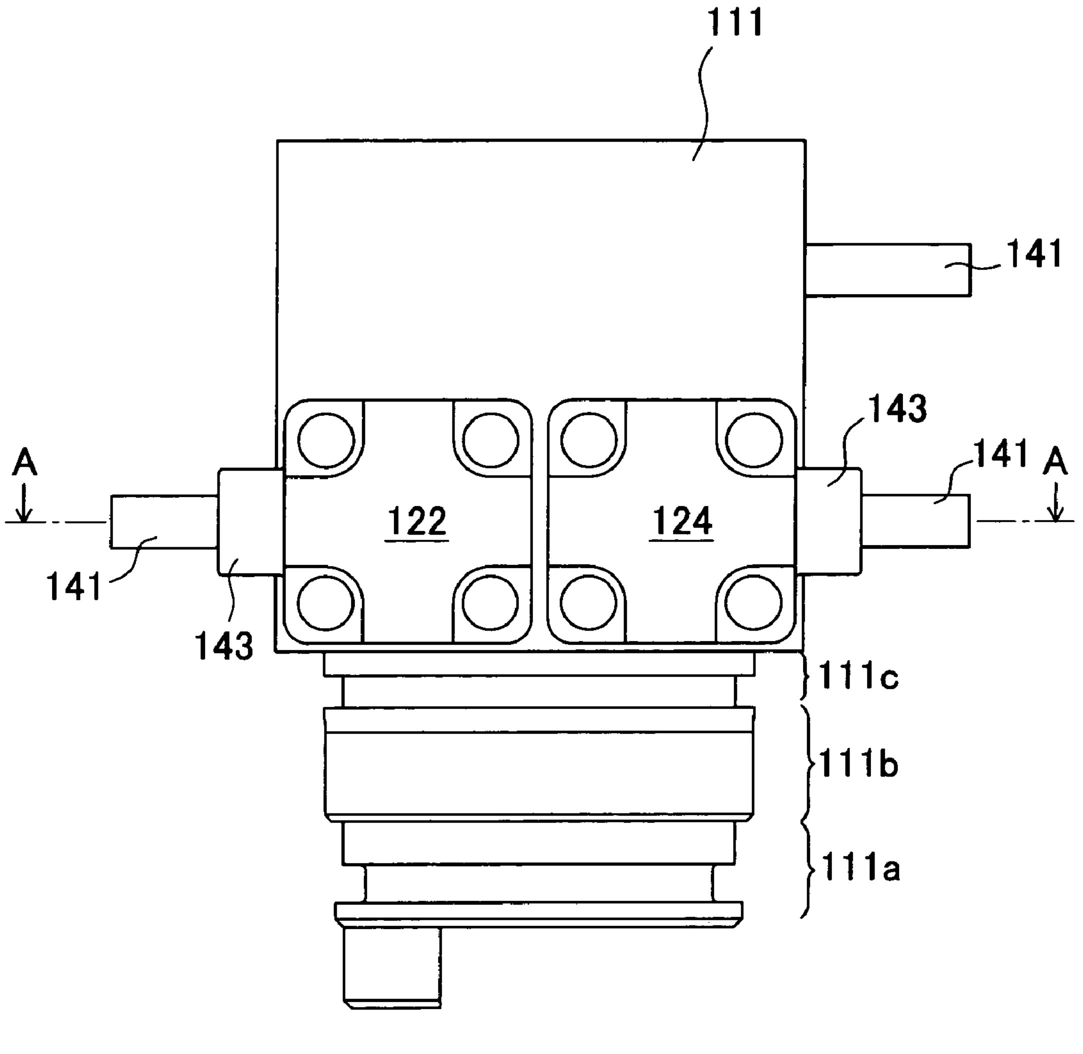
FIG. 12 is an external side view of a fluid coupling block in the second embodiment.
Figure 13:
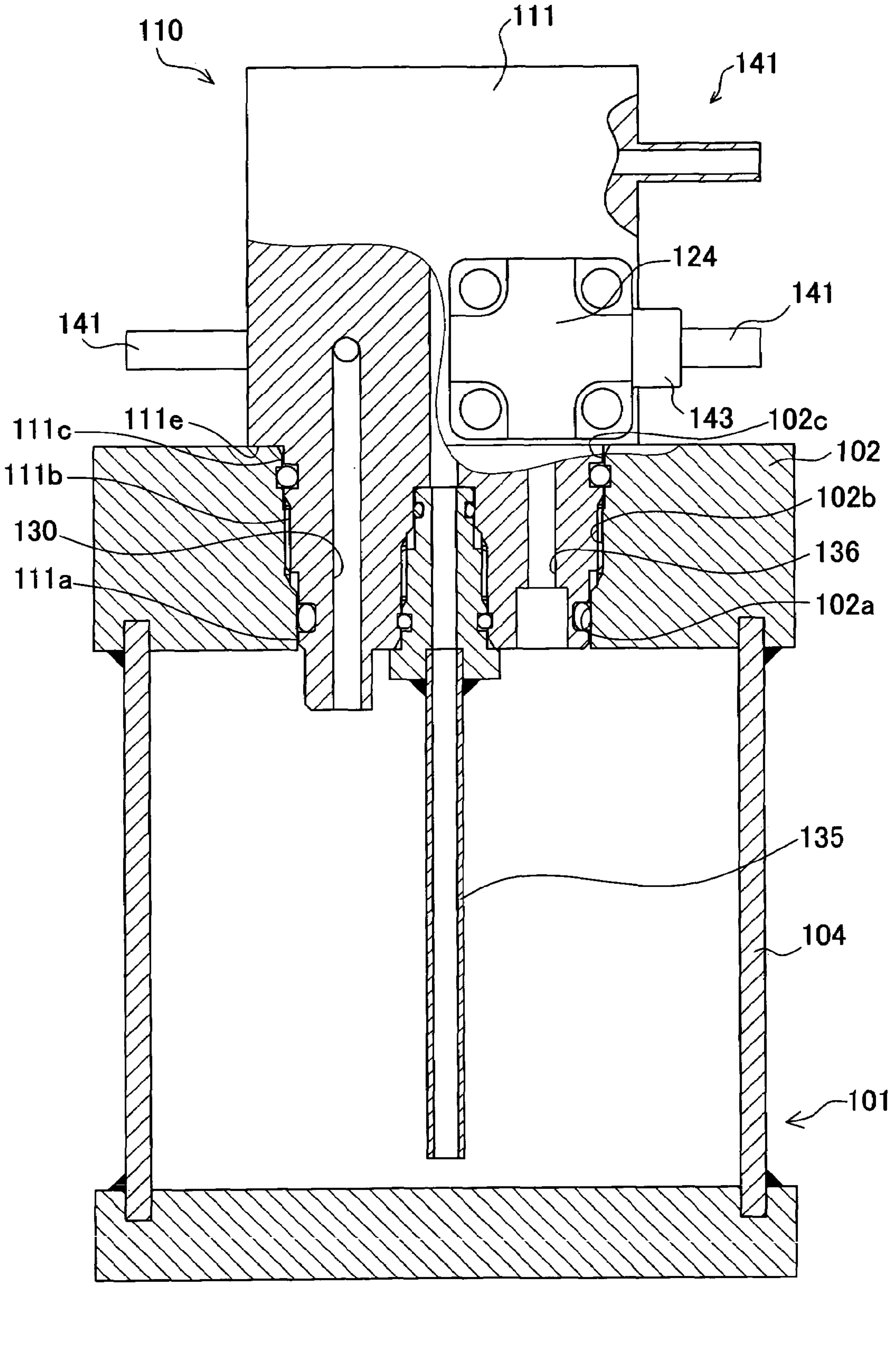
FIG. 13 is a sectional view of the tank structure taken along a line A-A of FIG. 11, partially including an external view.
Figure 14:
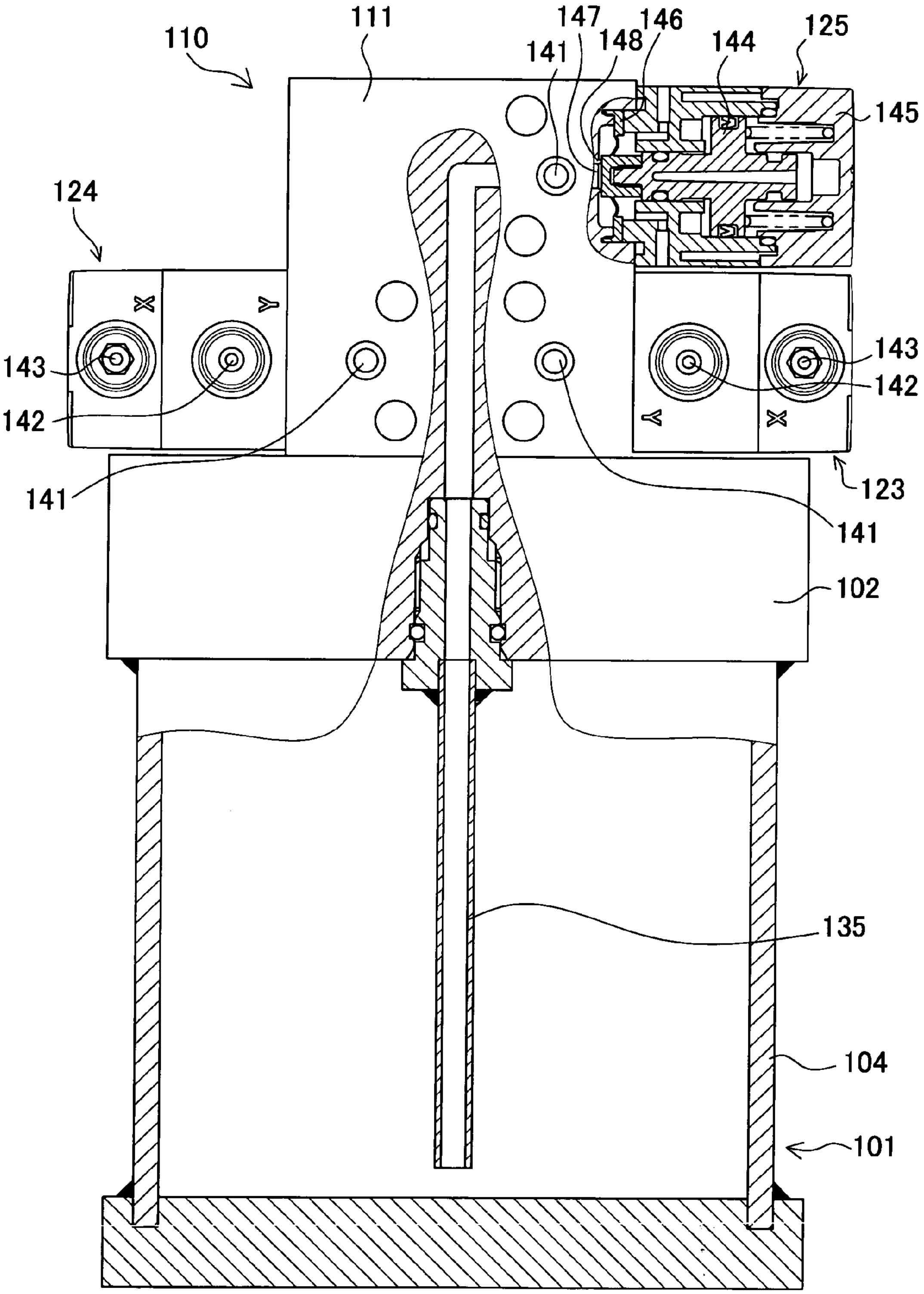
FIG. 14 is a sectional view of the tank structure taken along a line B-B line of FIG. 11, partially including an external view.

FIGS. 13 and 14 are sectional views of the tank structure comprising the above tank 101 and valve-coupling integrated unit 110, taken along a line A-A and a line B-B of FIG. 11 respectively but including partial external views. FIG. 12 is an external side view of the coupling block 111. This coupling block 111 constituting the valve-coupling integrated unit 110 is of a prismatic block shape provided with a first insert portion 111*a* having a columnar shape which is engageable in the small-diameter portion 102*a* of the sealing cover 102, an externally-threaded portion 111*b*, and a second insert portion 111*c* having a columnar shape which is engageable in the large-diameter portion 102*c* of the sealing cover 102.

The above coupling block 111 is assembled to the tank 101 in such a manner that the first insert portion 111*a* holding an O-ring in the outer periphery is set in the opening of the sealing cover 102, and the externally-treaded portion 111*b* is threadedly engaged with the internally-threaded portion 102*b* of the sealing cover 102 to push the first insert portion 111*a* of the coupling block 111 into the small-diameter portion 102*a* of the sealing cover 102 sealingly. Simultaneously, the second insert portion 111*c* is pushed into the large-diameter portion 102*c* of the sealing cover 102. In the second insert portion 111*c*, an O-ring is arranged to prevent the valve-coupling integrated unit 110 from becoming erroneously detached from or rotating with respect to the sealing cover 102.

As shown in FIG. 13, the coupling block 111 is formed with the liquid supply passage 130, the liquid discharge passage 135 and the gas supply/exhaust passage 136, which are formed as vertically-extending holes opening toward the bottom of the coupling block 111. The liquid supply passage 130 is connected in communication to the liquid supply passages 131 and 132 respectively formed as laterally-extending holes branching from the liquid supply passage 130. Similarly, the gas supply/exhaust passage 136 is connected in communication to the gas supply passage 133 and the gas exhaust passage 134 respectively formed as laterally-extending holes branching from the gas supply/exhaust passage 136. The liquid discharge passage 135 is formed as a vertically-extending hole one end of which is close to the upper surface of the coupling block 111 and the other end is close to the bottom of the tank housing 104. As shown in FIG. 14, the valve seat 148 is formed at each of the open ends of the liquid supply passages (131, 132) and the open ends of the gas supply passage 133, gas exhaust passage 134, and liquid discharge passage 135, which open toward the side surfaces of the coupling block 111. To each of the open ends, a uniform valve (121-125) is attached, constituting the valve-coupling integrated unit 110. This is an air-operated valve which is opened and closed in response to operations of the piston 144 by compression air.

Figure 15:
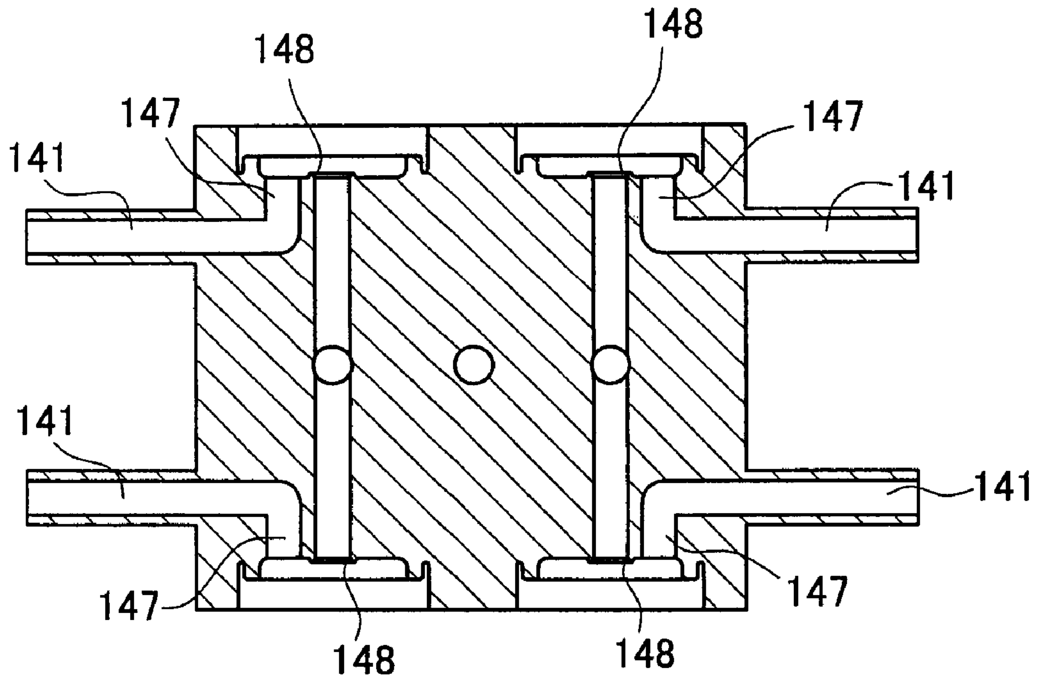
FIG. 15 PRIOR ART
FIG. 15 is a view of a tank structure in a prior art.
Figure 16:
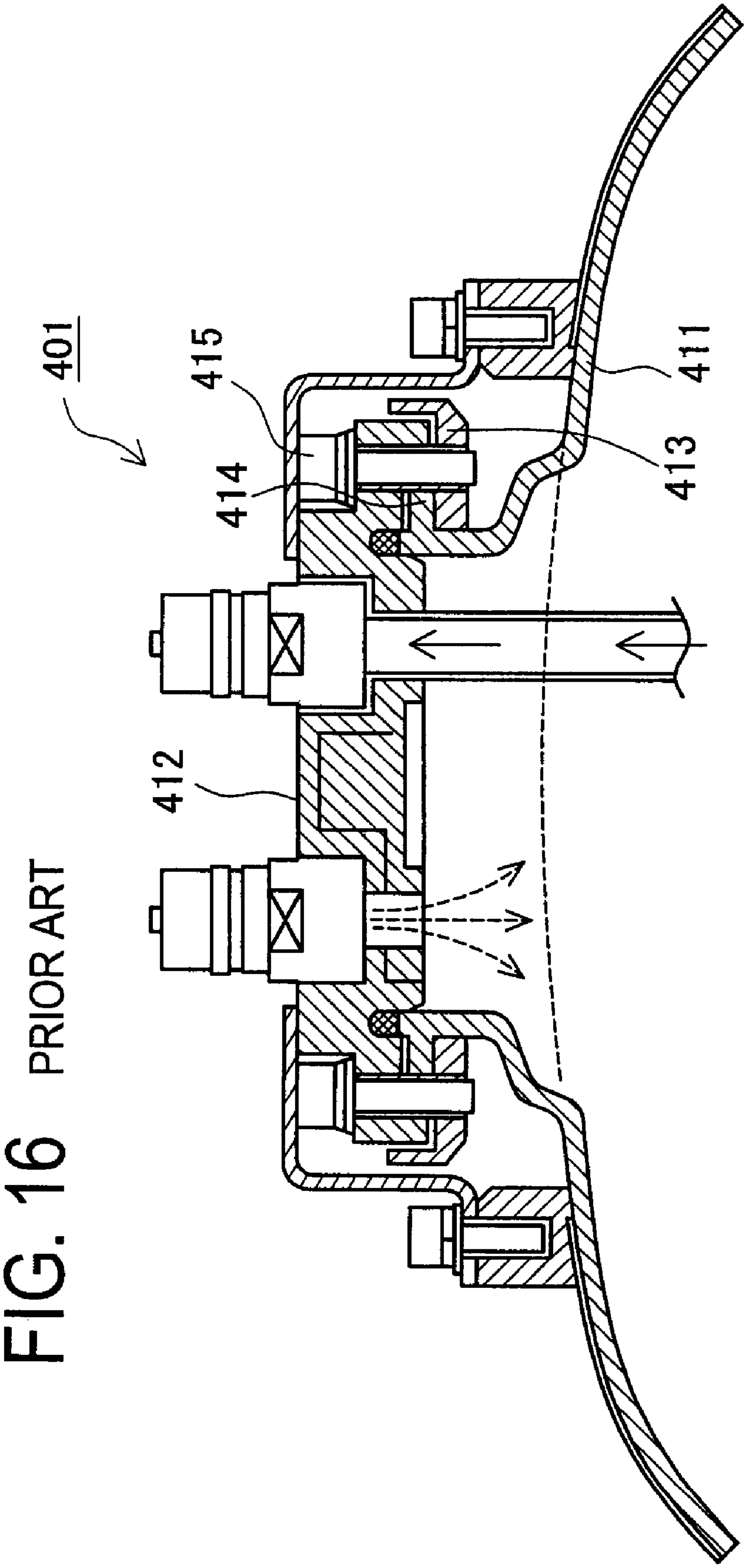
FIG. 16 PRIOR ART
FIG. 16 is a view of a tank structure in another prior art.
Figure 17:
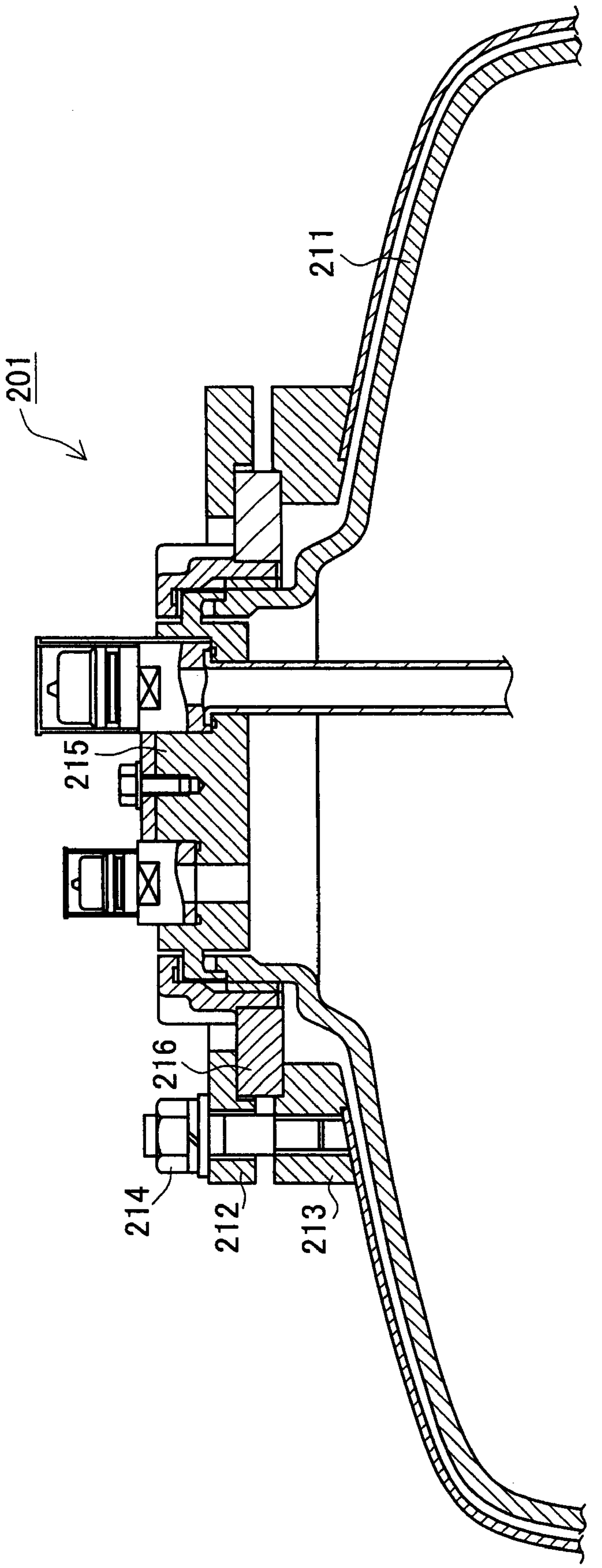
FIG. 17 PRIOR ART
FIG. 17 is a view of a tank structure in another prior art.
Figure 18:
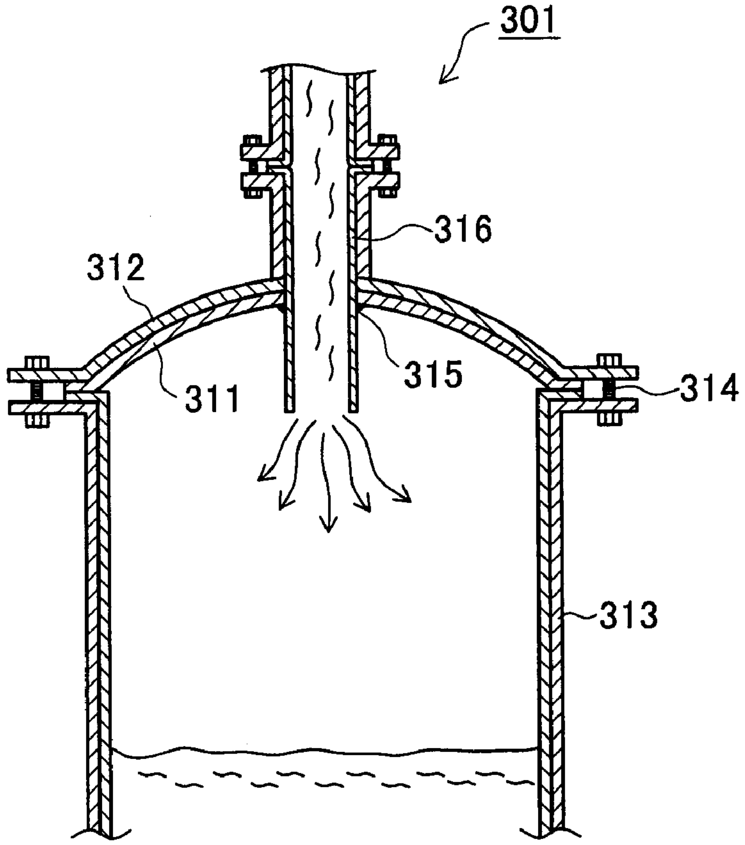
FIG. 18 PRIOR ART
FIG. 18 is a sectional view of a tank structure in another prior art.

Each valve (121-125) includes a body 145 integrally provided with air ports (142, 143) through which the compression air for operating the piston 144 is supplied/exhausted. Specifically, mounted in the body 145 of the valve 121 is a piston 144 which is slidably moved by the compression air supplied into the body 145 through the air ports (142, 143). A valve element 146 fixed to the end of the piston 144 blocks off the opening of the flow passage 147 to interrupt the communication to a port 141 serving as a coupling of the invention. The body 145 is secured to the coupling block 111 with bolts. FIG. 15 shows a sectional view of the coupling block 111 taken along a line A-A of FIG. 12. Here, as one of the features of the invention, the coupling block 111 is formed with the ports (couplings) 141 which will be connected to a chemical liquid line or a gas line. As shown in FIGS. 14 and 15, the valve seat 148 is previously formed at each of the open ends of the liquid supply passages (131, 132) of the coupling block 111 and the open ends of the gas supply passage 133, gas exhaust passage 134, and liquid discharge passage 135. Accordingly, there is no need to attach a valve body formed with a valve seat for each valve to the coupling block 111. This makes it possible to reduce the number of parts or members needed for mounting of each valve (121-125) to the coupling block 111 and to facilitate assembling of each valve to the coupling block 111.

[Operations of the Tank Structure in the Second Embodiment]

Operations of the tank structure in which the sealing cover 102 and the valve-coupling integrated unit 110 are mounted on the tank 101 will be explained below.

When operation air is supplied to each valve (121-125) through the air port 143, the piston 144 is allowed to slide toward the fluid coupling block 111 until the valve element 146 is brought into contact with the valve seat 148 formed at the open end of the flow passage 147. Each valve is thus placed in a valve-closed state where the liquid supply passage 130, liquid discharge passage 135, and gas supply/exhaust passage 136 of the coupling block 111 are placed in non-communication with the relevant ports 141 connected to the liquid supply line 150 and others. When the operation air is supplied to each valve (121-125) through the air port 142, on the other hand, the piston 144 is allowed to slide away from the coupling block 111, bringing the valve element 146 out of contact with the valve seat 148 at the opening of the flow passage 147. Accordingly, the liquid supply passage 130, liquid discharge passage 135, and gas supply/exhaust passage 136 of the coupling block 111 are brought into communication with the ports 141 connected to the liquid supply line 150 and others respectively.

When the chemical liquid stored in the tank 101 is to be discharged out of the tank 101, the valves 121, 122 and 124 are closed and the valves 123 and 125 are opened.

Hence, pressurized N2 gas (or air) is fed from the gas supply line 170 to the tank 101 through the gas supply passage 133 and gas supply/exhaust passage 136 of the coupling block 111. In this case, the tank 101 is made of tetrafluoroethylene (PTFE, PFA) resin which is low in strength. The tank 101 is controlled by the pressure reducing valve (not shown) to prevent the internal pressure of the tank 101 from exceeding a predetermined pressure. In the tank 101, the pressure of a gas layer is increased by the supplied N2 gas, pressurizing the chemical liquid of a liquid layer from above. Then, the chemical liquid is allowed to flow out of the tank 101 through the liquid discharge passage 135 extending from the coupling block 111 to near the bottom of the tank housing 104, the valve 125, and the liquid discharge line 190. At this time, the pressure of the supply gas is controlled while the pressure to be applied on the chemical liquid in the tank 101 is measured by the pressure gage (not shown). Consequently, the pressure of the chemical liquid to be discharged from the tank 101 through the liquid discharge passage 135 is controlled.

When the chemical liquid is to be supplied to the tank 101, on the other hand, the valves 123 and 125 are closed and the valves 121, 122, and 124 are opened. Then, the chemical liquid fed through the liquid supply lines 150 and 160 is allowed to pass through the open valves 121 and 122 into the tank 101 via the liquid supply passage 130 of the coupling block 111. In the tank 101, the liquid level of the liquid layer is increased by the supplied chemical liquid, decreasing the volume of the upper gas layer, thereby pressurizing the N2 gas in the tank 101. Accordingly, N2 gas is allowed to flow out of the tank 101 into the gas supply/exhaust passage 136 of the coupling block 111. At this time, the valve 123 is closed but the valve 124 is open. The N2 gas is therefore allowed to flow in the gas exhaust passage 134 without flowing in the gas supply passage 133. The N2 gas is then allowed to pass through the valve 124 and discharged through the gas discharge line 180. As above, the chemical liquid is filled in the tank 101 while discharging N2 gas therefrom.

According to the second embodiment, the valve-coupling integrated unit 110 is configured such that the coupling block 111 formed with the liquid supply passage 130, the liquid discharge passage 135, the gas supply/discharge passage 136, and the valve seats 148 is mounted on the open end side of the tank housing 104 and the valves (121-125) are mounted on the coupling block 111. The tank structure in the present embodiment can have a simple configuration.

The internally-threaded portion 111*b* is threadedly engaged with the externally-threaded portion 102*b* of the sealing cover 102 to sealingly push the first insert portion 11*a* of the coupling block 111 into the small-diameter portion 102*a* of the sealing cover 102 and the second insert portion 111*c* into the large-diameter portion 102 of the sealing cover 102. Thus, the coupling block 111 can readily be mounted on the tank 101 by such a simple operation. It is further possible to enhance the assembled state of the valve-coupling integrated unit 110 to the tank 101. This simple mounting operation can reduce a manufacturing cost as compared with a conventional structure. The valve-coupling integrated unit 110 may simply be mounted on the sealing cover 2 fixed to the tank housing 104. This makes it possible to facilitate maintenance in case of liquid or gas leakage as compared with a conventional structure needing a plurality of joints or couplings.

The valve-coupling integrated unit 110 is structured such that the valves (121-125) are integrally mounted on the coupling block 111. Accordingly, the section around the tank which would be complicated can be simplified and the space for a fluid circuit configured by the lines (150, 160, 170, 180, 190) can be reduced. The integrated structure allows the valves (121-125) to be concentrated in one place, so that replacement can be made easy and maintenance property can be improved.

As mentioned above, the tank structure can be achieved by a small number of integrated parts or components with space savings, and the mounted state of the valve-coupling integrated unit 110 to the tank 101 can be enhanced.

Further, as shown in FIG. 13, the valve-coupling integrated unit 110 is mounted on the sealing cover 102 in such a manner that a lower surface 111*e* of the coupling block 111 is placed in contact with the upper surface of the sealing cover 102. Accordingly, no space or gap is generated between the lower surface of the coupling block 111 and the upper surface of the sealing cover 102, thereby ensuring the connection between the coupling block 111 and the sealing cover 102. Consequently, the mounted state of the valve-coupling integrated unit 110 to the tank 101 can be enhanced.

The liquid supply passage 130 extends so that its lower end is positioned lower than the lower end of the gas supply/exhaust passage 136 as shown in FIG. 13. Accordingly, the liquid supplied into the tank 101 through the liquid supply passage 130 can be prevented from directly flowing in or entering the gas supply/exhaust passage 136. Further, the chemical liquid and its mist gas will not be discharged or exhausted through the gas supply/exhaust passage 136 together with the exhaust gas. Further, the gas supply/exhaust passage 136 has a large-diameter lower end portion as shown in FIG. 13. This diameter is larger than the diameter of the liquid supply passage 130. Accordingly, the flow rate of gas in the lower end portion of the gas supply/exhaust passage 136 can be restrained. It is therefore possible to prevent the liquid supplied through the liquid supply passage 130 from directly flowing in or entering the gas supply/exhaust passage 136. Consequently, the chemical liquid and its mist gas will not be discharged or exhausted through the gas supply/exhaust passage 136 together with the exhaust gas.

The tank structure in the second embodiment as mentioned above can have the following effects and advantages.

(1) As mentioned above, the tank structure has the tank housing 104 storing chemical liquid, the liquid supply passage 130 through which the chemical liquid is supplied into the tank housing 104, the liquid discharge passage 135 through which the chemical liquid is discharged from the tank housing 104, and the gas supply/exhaust passage 136 through which gas is supplied to or exhausted from the tank housing 104. Such tank structure further comprises: the valve-coupling integrated unit 110 including the valves (121-125) for controlling the flow rate and the coupling block 111 internally provided with the liquid supply passage 130, the gas supply/exhaust passage 136, and the valve seat 148; and the tank 101 having the tank housing 104 and the sealing cover 102 having the opening (102*a*, 102*b*, 102*c*) in which the insert part (111*a*, 111*b*, 111*c*) of the coupling block 111 is engaged. Accordingly, the coupling block 111 previously formed with the valve seats 148 may be simply fixed to the sealing cover 102 to realize the tank structure having the valve-coupling integrated unit 110 and the tank 101. Such integrated space-saving structure can be achieved by a reduced number of parts or components.

(2) In the tank structure configured as above (1), the opening (102*a*, 102*b*, 102*c*) of the sealing cover 102 and the insert portion (111*a*, 111*b*, 111*c*) of the coupling block 111 are provided with respective threaded portions (102*b*, 111*b*). The threaded portion 102*b* of the opening (102*a*, 102*b*, 102*c*) of the sealing cover 102 is engaged with the threaded portion 111*b* of the insertion parts (111*a*, 111*b*, 111*c*) of the coupling block 111 to integrally connect the sealing cover 102 to the coupling block 111. Accordingly, in addition to the above mentioned effects and advantages, such integrated structure can be achieved by a further reduced number of parts or components, providing further space-saving structure. Furthermore, the sealing cover 102 and the coupling block 111 can be tightly fastened to each other by screw-engagement. This makes it possible to enhance the assembled relation of the tank 101 including the sealing cover 102 and the valve-coupling integrated unit 110 including the coupling block 111.

(3) The lower end of the gas supply/exhaust passage 136 is positioned higher than the lower end of the liquid supply passage 130 in the axial direction of the tank housing 104. This configuration makes it possible to prevent the chemical liquid supplied into the tank housing 104 through the liquid supply passage 130 from directly flowing in or entering the gas supply/exhaust passage 136. Consequently, the chemical liquid and its mist gas can be prevented from flowing out from the gas supply/exhaust passage 136.

(4) In addition, the diameter of the lower end of the gas supply/exhaust passage 136 in the axial direction of the tank housing 104 is larger than the diameter of the liquid supply passage 130. Accordingly, the flow rate in the gas supply/exhaust passage 136 can be restrained. Consequently, the chemical liquid and its mist gas can be prevented from flowing out from the gas supply/exhaust passage 136.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A tank structure that has a tank body for storing liquid and a control device for supplying or discharging the liquid to or from the tank body, the tank structure comprising:

a flat upper member having a lower flat surface;

a flat lower member having an upper flat surface; and a valve and coupling integrated unit, wherein the tank body has an upper flat surface and a lower flat surface which face the lower flat surface of the upper member and the upper flat surface of the lower member respectively, the tank body is held in sandwiched relation between the upper and lower members so that the upper and lower flat surfaces of the tank body are in contact with the lower flat surface of the upper member and the upper flat surface of the lower member respectively, and the upper member and the lower member are wider in area than the upper and lower flat surfaces of the tank body, fastening members are provided in peripheral portions of the upper and lower members extending wider than the upper and lower flat surfaces of the tank body to fasten the upper member and the lower member between which the tank body is placed, and the valve and coupling integrated unit includes:

a liquid supply coupling for allowing the liquid to flow in the tank body;

a liquid discharge coupling for allowing the liquid to flow out of the tank body;

a gas supply coupling for supplying gas to the tank body to discharge the liquid from the tank body;

a gas exhaust coupling for exhausting the gas from the tank body;

a liquid supply valve for controlling a flow rate of the liquid, a gas supply valve for controlling a flow rate of the gas to be supplied;

a gas exhaust valve for controlling a flow rate of the gas to be exhausted;

a liquid supply passage for providing communication between the liquid supply coupling and the tank body via the liquid supply valve; and a gas passage for providing communication between the gas supply coupling and the tank body via the gas supply valve and providing communication between the gas exhaust coupling and the tank body via the gas exhaust valve.

2. The tank structure according to claim 1, wherein the lower member is a base member to be located on the ground when the tank body is installed.

3. The tank structure according to claim 1, wherein the upper and lower members are made of materials having higher strength than a material of the tank body.

4. The tank structure according to claim 1, wherein the fastening member has a head, and the tank structure further comprises a resilient member placed between the head of the fastening member and the upper member.

5. The tank structure according to claim 1, wherein the control device is mounted on an upper surface of the upper member.

6. The tank structure according to claim 1, wherein the control device is mounted on an upper surface of the upper member within a predetermined area.

7. The tank structure according to claim 1, wherein a part of the valve and coupling integrated unit is mounted in an opening of the tank body.

8. The tank structure according to claim 1, wherein a lower end of the gas passage in an axial direction of the tank body is in a higher position than a lower end of the liquid supply passage.

9. The tank structure according to claim 1, wherein a lower end of the gas passage in the axial direction of the tank body has a larger diameter than a lower end of the liquid supply passage.

10. The tank structure according to claim 1, wherein the valve and coupling integrated unit is provided with a liquid discharge passage.

* * * * *